United States Patent
Balbi

(10) Patent No.: US 8,240,171 B2
(45) Date of Patent: Aug. 14, 2012

(54) GLASSWARE MANUFACTURING METHOD AND MACHINE

(75) Inventor: Mario Balbi, Cuneo (IT)

(73) Assignee: BOTTERO S.p.A., Cuneo (IT)

( * ) Notice: Subject to any disclaimer, the term of this patent is extended or adjusted under 35 U.S.C. 154(b) by 527 days.

(21) Appl. No.: 12/410,549

(22) Filed: Mar. 25, 2009

(65) Prior Publication Data
US 2009/0241601 A1 Oct. 1, 2009

(30) Foreign Application Priority Data
Mar. 27, 2008 (IT) ................. TO2008A0234

(51) Int. Cl.
*C03B 40/027* (2006.01)
(52) U.S. Cl. ................. 65/168; 65/170; 65/243; 65/227
(58) Field of Classification Search ................. 65/26, 27, 65/170, 168, 227, 243
See application file for complete search history.

(56) References Cited

U.S. PATENT DOCUMENTS

| | | | | |
|---|---|---|---|---|
| 3,617,232 A | * | 11/1971 | Goodwin | 65/137 |
| 3,721,542 A | * | 3/1973 | Keller | 65/169 |
| 3,814,594 A | * | 6/1974 | Mumford | 65/169 |
| 4,332,606 A | * | 6/1982 | Gardner | 65/158 |
| 4,737,181 A | * | 4/1988 | Lopez-Zermeno et al. | 65/29.1 |
| 4,861,363 A | * | 8/1989 | Brown | 65/24 |
| 4,867,777 A | * | 9/1989 | Doud | 65/26 |
| 5,597,396 A | * | 1/1997 | Tohjo | 65/169 |
| 5,938,806 A | * | 8/1999 | Mine et al. | 65/26 |

* cited by examiner

*Primary Examiner* — John Hoffmann
(74) *Attorney, Agent, or Firm* — Oblon, Spivak, McClelland, Maier & Neustadt, L.L.P.

(57) ABSTRACT

A glassware manufacturing method and machine, whereby the inner surfaces of the molds of the various forming sections of the machine are treated using a common processing member, and the exhaust substances produced by the treatment are aspirated simultaneously with or at a predetermined time during the treatment by a suction device having at least one suction hood associated with the processing member.

9 Claims, 4 Drawing Sheets

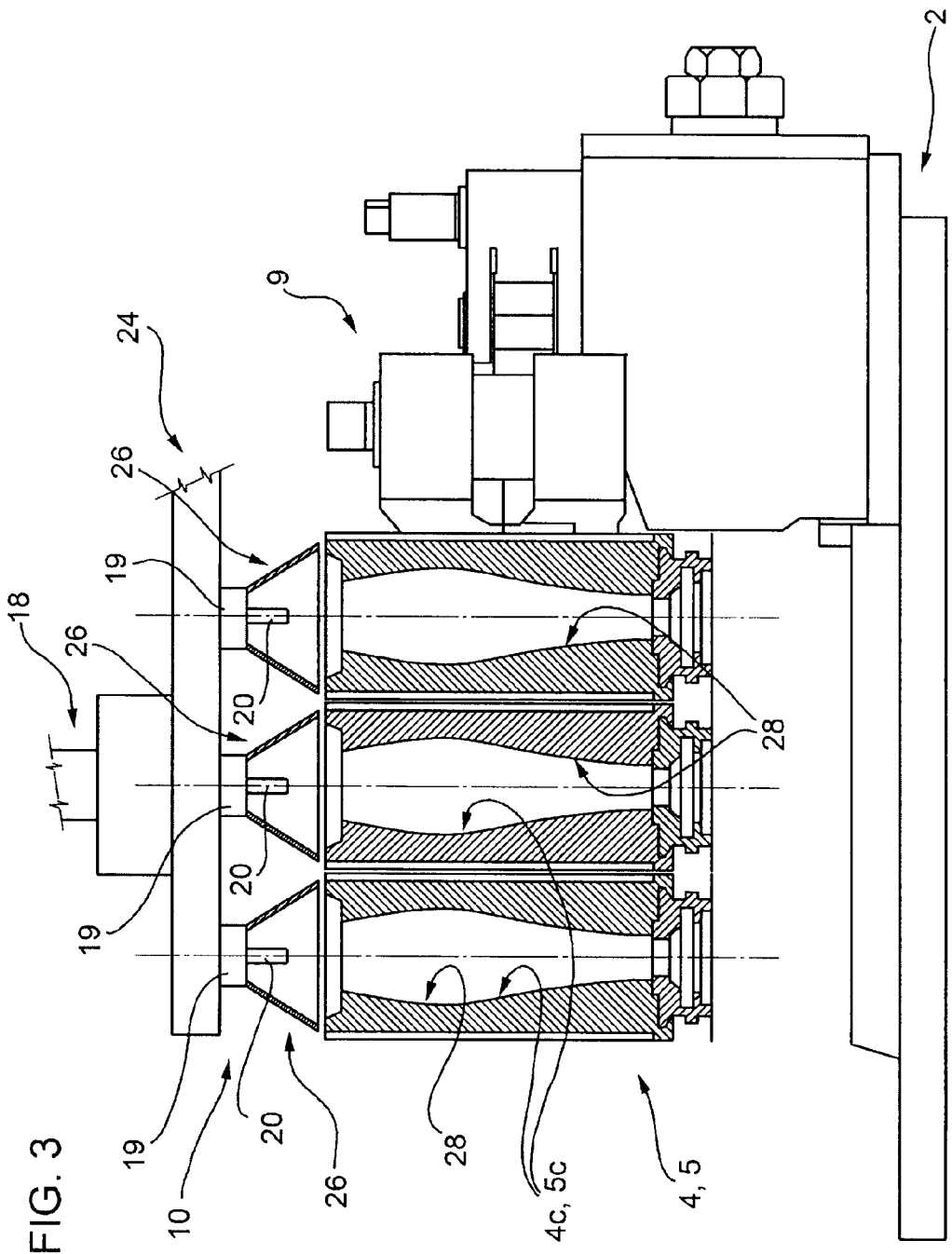

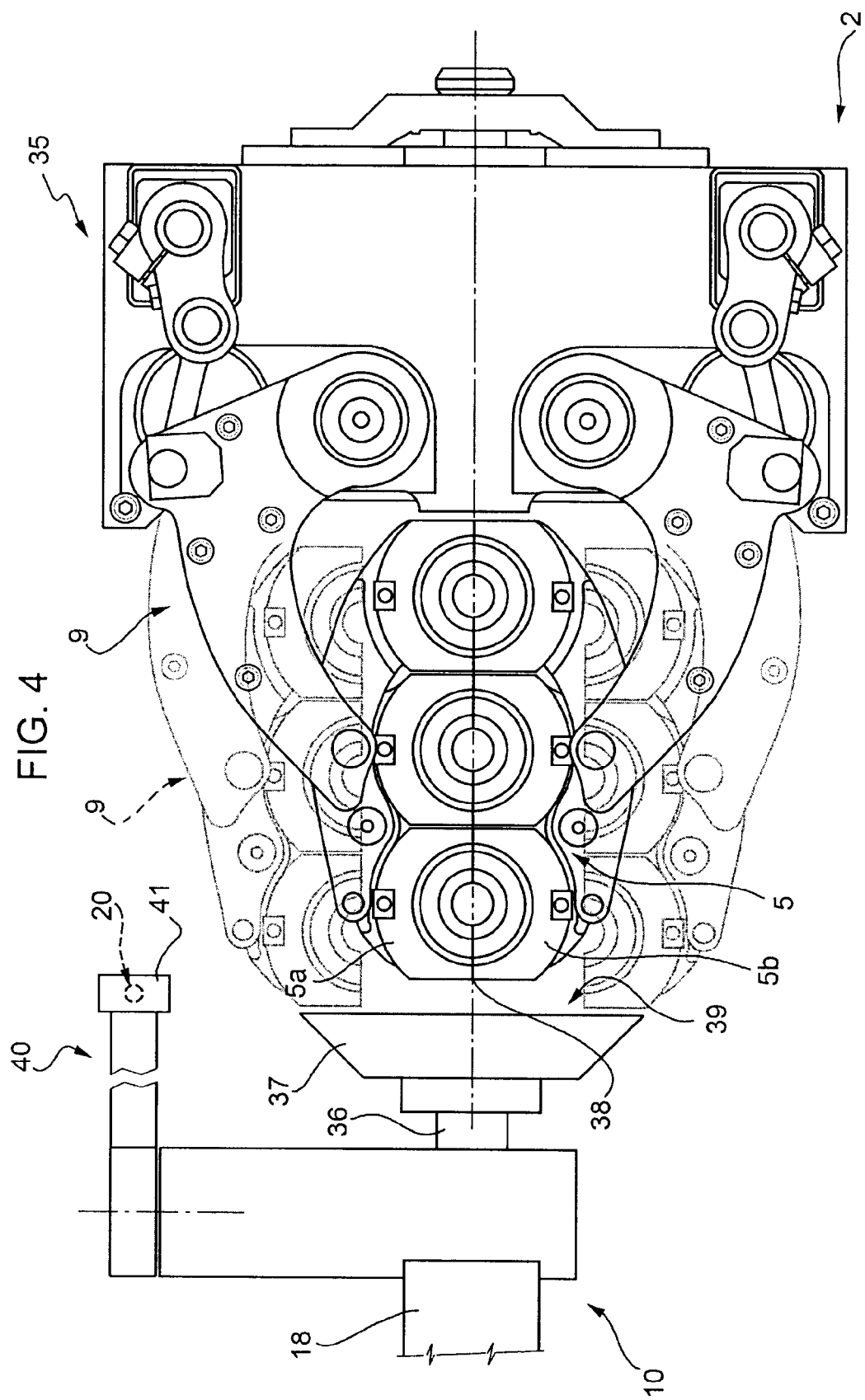

GLASSWARE MANUFACTURING METHOD AND MACHINE

The present invention relates to a glassware manufacturing method.

BACKGROUND OF THE INVENTION

In glassware molding, molding machines, such as the type commonly known as I.S. machines, are employed comprising a number of side by side forming sections, each for producing a respective sequence of articles.

Each forming section comprises a rough mold, normally with one or a number of adjacent mold cavities, each for receiving a glass gob and forming a respective semifinished article, which is then transferred by an inverter to a mold cavity of a finish mold to be transformed into the finished article.

Each mold normally comprises a bottom shell; and two lateral half-molds movable with respect to each other and the relative bottom shell between a closed position, in which the lateral half-molds and the bottom shell define the mold cavities, and an open position in which enable the removal of the semifinished or finished articles from the mold.

To facilitate distribution of the glass inside the mold and removal of the article from the mold to obtain articles of consistent surface quality and shape, the molds are cleaned and lubricated regularly. This substantially consists in removing scale from the inner surfaces of the mold contacting the glass, and coating the surfaces with a release agent or lubricant, e.g. graphite-based, to prevent the glass from sticking to the inside of the mold and so producing flaws in the surface or shape of the semifinished or finished article when it is removed from the mold.

The surfaces are normally lubricated either by hand, or by spraying the lubricant on using spray heads that can operate with the mold open or closed.

Whichever the case, given the high temperature of the molds, applying, and particularly spraying, lubricant onto the inner surfaces of the molds inevitably produces emissions which, together with the powdery scale removed, contaminate the surrounding area by settling on machine parts in the vicinity of the molds, thus calling for regular cleaning, and also make for an unhealthy workplace.

The work carried out on each mold is relatively time-consuming and increases in proportion to the number of machine sections, with the result that downtime and the length of time workers are exposed to such work bear heavily on the production cycle.

SUMMARY OF THE INVENTION

It is an object of the present invention to provide a glassware manufacturing method designed to provide a straightforward, effective, low-cost solution to the above problems, and which in particular provides for reducing downtime and, hence, non-production.

According to the present invention, there is provided a method of manufacturing glassware on a glassware molding machine comprising a number of forming sections, each for forming a respective article, the method comprising the steps of employing, for each said section, at least one mold having two half-molds movable with respect to each other between a closed position, in which the inner surface of the mold defines a seat for a mass of glass, and an open position, in which the mold permits removal of the mass of glass; treating the inner surface of the mold using a processing member; and aspirating the substances exhausted by said step of treating said inner surface; said treating and aspirating steps being performed by moving at least one processing member and suction means, common to all the forming sections, between the molds of said forming sections.

The present invention also relates to a glassware molding machine.

According to the present invention, there is provided a glassware manufacturing machine comprising a number of adjacent forming sections, each for forming a relative article; each forming section comprising at least one mold having two half-molds, and actuating means for moving the half-molds with respect to each other between a closed position, in which an inner surface of the mold defines a seat for a mass of glass, and an open position, in which the mold permits removal of the mass of glass; the machine also comprising at least one processing member common to all the sections and for treating the inner surfaces of said molds; suction means associated with the common said processing member to aspirate the substances exhausted by treating said inner surfaces; and drive means for moving the common said processing member and said suction means between the molds of said forming sections.

BRIEF DESCRIPTION OF THE DRAWINGS

A number of non-limiting embodiments of the invention will now be described by way of example with reference to the accompanying drawings, in which:

FIG. 3 shows a schematic side view, with parts removed for clarity, of a further variation of part of the FIG. 1 machine;

FIG. 4 shows a schematic plan view, with parts removed for clarity, of a second preferred embodiment of the molding machine according to the present invention;

DETAILED DESCRIPTION OF THE INVENTION

Figure 1:
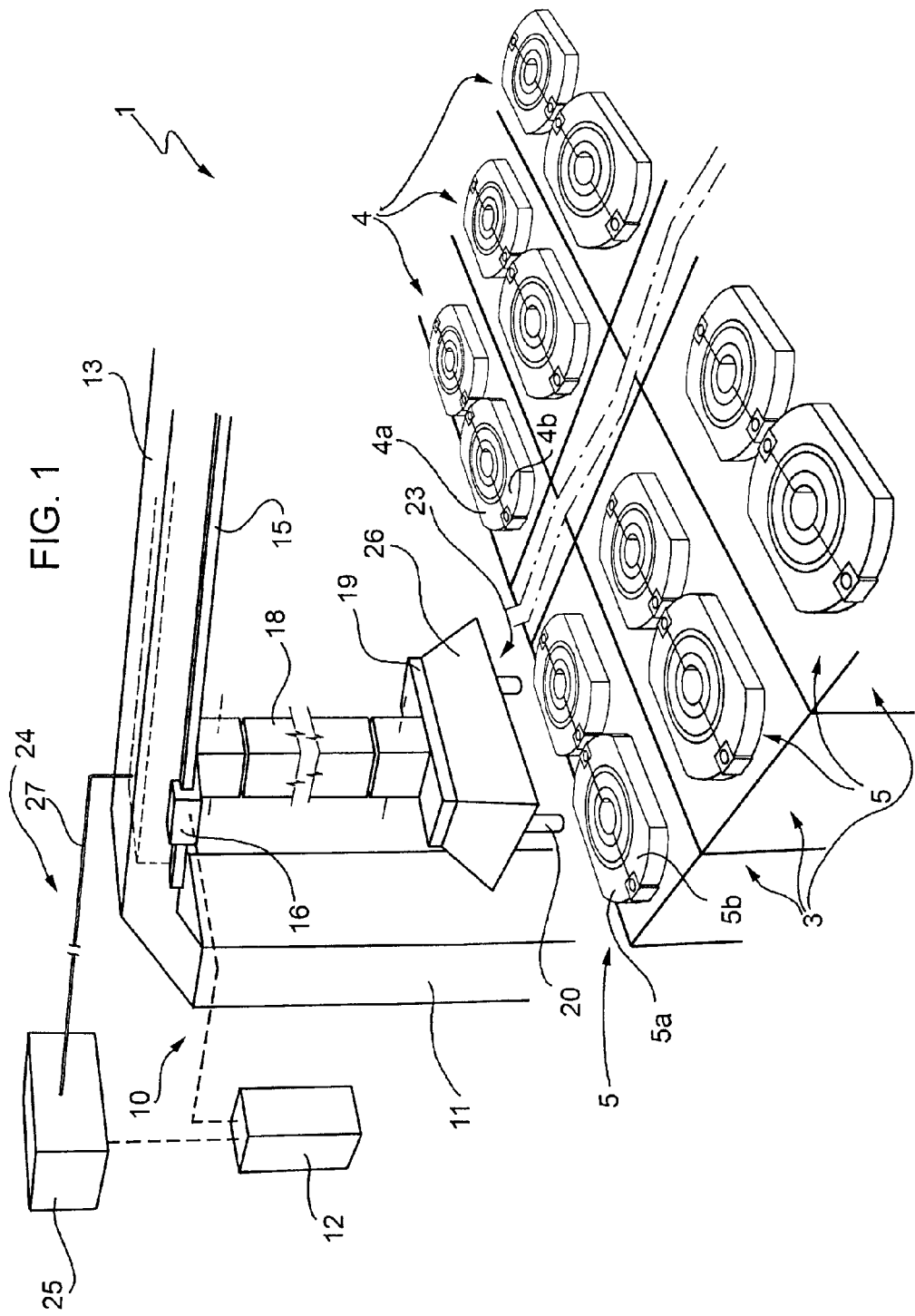
FIG. 1 shows a schematic view in perspective of a first preferred embodiment of the molding machine according to the present invention.

Number 1 in FIG. 1 indicates as a whole a glassware manufacturing machine comprising a supporting structure 2; and a number of adjacent known forming sections 3, not described in detail, each for forming a relative article.

Each forming section 3 comprises a rough mold 4; a finish mold 5, in this case with two cavities; a known assembly, not shown, for transferring articles from rough mold 4 to finish mold 5; and a known assembly, not shown, for transferring the finished article from finish mold 5 to a known unloading conveyor not shown.

Each mold 4, 5 comprises two half-molds 4a, 4b, 5a, 5b connected in known manner to a relative actuating assembly 9 (FIGS. 3, 4) for moving the half-molds with respect to each other between a closed position (FIGS. 1, 4), in which an inner surface 4c, 5c of the mold defines a seat for a mass of glass, and an open position, in which the mold permits removal of the mass of glass.

As shown in FIG. 1, machine 1 also comprises a mold treating assembly 10 common to all of sections 3 and for treating molds 4, 5 of sections 3.

Assembly 10 is controlled by a respective control unit 12 synchronized with each section 3, and comprises a fixed supporting structure 11 connected to structure 2 of machine 1 and comprising a cross member 13. Cross member 13 extends across machine 1, crosswise to sections 3, perpendicular to the travelling direction of the masses of glass in sections 3, and, in the example shown, over molds 4, 5. In an alternative variation not shown, cross member 13 extends below a top end of mold 4, 5. In both solutions, cross member 13 is fitted integrally with a straight runner 15, along which runs both ways a powered carriage 16 forming part of assembly 10 and fitted in known manner with one end of a controlled-axis articulated arm 18 also forming part of assembly 10.

Arm 18 is fitted on its free end with a head 19 for attaching a mold processing member 20, which may conveniently be a spray member, or a powered scraper or cleaning brush for brushing deposits off the inner surfaces of molds 4, 5, regardless of the relative position of the half-molds. The spray member forms the end member of a spray device 23 for spraying lubricant onto inner surface 4c, 5c of mold 4, 5, and which also comprises a pipe (not shown) for feeding lubricant to the head and connected at one end to spray member 20, and at the other end to a dispenser on or off machine 1.

As shown in FIG. 1, assembly 10 also comprises a suction device 24 associated with device 23 to withdraw from molds 4, 5 the exhaust produced by processing member 20. More specifically, suction device 24 comprises a suction unit 25 (shown schematically); a suction hood 26; and an exhaust conduit 27 connected to suction hood 26 at one end, and to suction unit 25 at the other.

Figure 2:
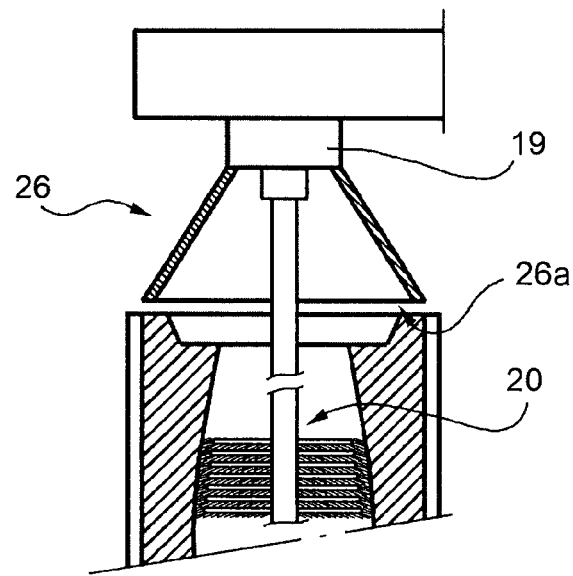
FIG. 2 shows a schematic of a variation of a detail in FIG. 1.

With reference to FIG. 1, suction hood 26 is designed according to the type of molds 4, 5 fitted to sections 3. More specifically, in the case of single-cavity molds, hood 26 surrounds processing member 20, and extends axially, i.e. in the same direction as processing member 20, sufficiently to house the whole of processing member 20 (FIG. 3), or so that the processing member projects from an axial edge 26a of hood 26, as shown in FIGS. 1 and 2, by a length depending on the type of mold and how the mold is to be processed.

In the case of multiple-cavity molds, i.e. comprising two or more side by side cavities 28 as shown in FIG. 3, a hood 26 of the above type is provided for each cavity 28, and cavities 26 are all connected to the same exhaust conduit 27.

Alternatively, as shown in FIG. 1, head 19 is fitted with a single hood 26 common to all of cavities 28, and at least partly housing a number of processing members 20 equal to the number of cavities 28.

In actual use, when one of molds 4, 5 of one of sections 3 needs cleaning or lubricating, unit 12, given the location of the mold 4, 5 for processing, moves carriage 16 along runner 15 from a rest position, and arranges articulated arm 18 to position head 19 over the mold 4, 5 for processing, and set processing member 20, and therefore suction hood 26, to the correct operating position. At this point, simultaneously with or at a given time after commencing processing of the inner surface of mold 4, 5, suction unit 25 is activated, and the exhaust materials produced by processing the mold are aspirated from the mold area to prevent them settling on and fouling the machine, or being inhaled or touched by machine operators. Once processing is completed, head 19 is withdrawn from the processed mold 4, 5, and assembly 10 is again ready to process another mold 4, 5 or the same or a different section 3.

The FIG. 4 variation shows a machine 35 which differs in a few construction details from machine 1, and the parts of which are indicated, where possible, using the same reference numbers as for the corresponding parts of machine 1.

Articulated arm 18 of machine 35 supports a head 36 fitted with a single hood 37, which is positioned in use facing a vertical mating plane 38 of half-molds 5a, 5b to communicate with the inside of the cavity when half-molds 5a, 5b are in the open position. Accordingly, hood 37 has a conveniently rectangular exhaust inlet 39 with a long side substantially equal to or only slightly larger than the height of half-molds 5a, 5b, and with a short side only slightly larger than the distance between the mating edges of half-molds 5a, 5b in the open position, as shown by the faint line in FIG. 4.

Machine 35 also comprises a second articulated arm 40, which is also controlled by control unit 12, is connected at one end to carriage 16, and is fitted at the opposite end with a head 41 fitted with one or the other of said processing members 20.

Figure 5:
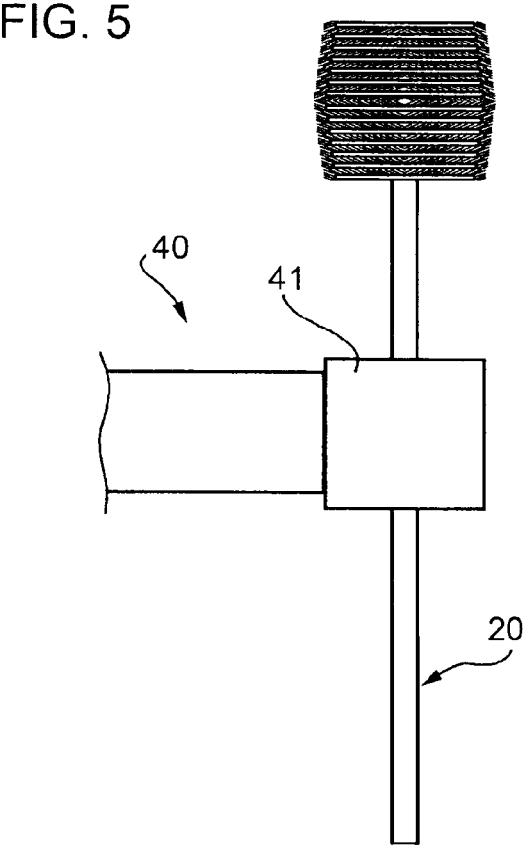
FIG. 5 shows a variation of a detail in FIG. 4.

In the FIG. 5 variation, head 41 is fitted with two different members 20 extending in two different directions, and which can be activated selectively, depending on how mold 4, 5 is to be processed. This solution obviously greatly reduces processing time, by enabling different processing of different parts of the same mold without having to retool assembly 10.

Clearly, changes may be made to machines 1 and 35 as described herein without, however, departing from the protective scope defined in the accompanying claims. In particular, runner 15 may be located otherwise than as described by way of example, and processing members 20 and suction hoods 26 may differ from those described.

The invention claimed is:

1. A glassware manufacturing machine comprising:
   a number of adjacent forming sections, each for forming a relative article, each forming section comprising molds, each having two half-molds;
   an actuator assembly to move the half-molds with respect to each other between a closed position, in which an inner surface of each mold defines a seat for a mass of glass, and an open position, in which removal of the mass of glass is permitted;
   a processing member common to all the sections and for treating the inner surfaces of said molds;
   suction means including a suction hood associated with the processing member to aspirate the substances exhausted by treating said inner surfaces; and
   a drive mechanism including a controller configured to move the processing member and said suction means between the molds of said forming sections, the drive mechanism including:
   a runner common to all the sections,
   a powered carriage movable both ways along said runner, and
   an articulated arm fitted to said carriage and terminating with a head to which at least said suction means are attached, wherein
   the controller is configured to move at least said suction means, with respect to each mold, between a withdrawn rest position, and a forward suction position in which said suction means is positioned facing a vertical mating line of said half-molds to communicate with the inside of said cavity when the half-molds are in the open position.

2. A machine as claimed in claim 1, wherein said processing member comprises a brush.

3. A machine as claimed in claim 2, further comprising:
   a plurality of additional processing members fitted side by side to said drive mechanism; and
   a respective suction hood, of said suction means, for each of said additional processing members.

4. A machine as claimed in claim 2, further comprising:
   a plurality of additional processing members fitted side by side to said drive mechanism, said suction means comprise a single suction hood, as the section hood of said suction means, which is common to the processing member and all of the additional processing members.

5. A machine as claimed in claim 1, wherein said processing member comprises a spray member for spraying lubricating.

6. A machine as claimed in claim 1, wherein said processing member extends entirely inside the suction hood of said suction means with respect to a volume defined by the suction hood.

7. A machine as claimed in claim 1, wherein said processing member is an elongated member projecting partly outwards of the suction hood of said suction means with respect to a volume defined by the suction hood.

8. A machine as claimed in claim 1, further comprising:
a further articulated arm fitted to said carriage and separate from said articulated arm; said further articulated arm terminating with a respective head fitted with at least said processing member.

9. A machine as claimed in claim 8, wherein the head of said further articulated arm is fitted with two different processing members that can be operated independently of each other.

* * * * *